United States Patent
Czompo

(10) Patent No.: US 9,625,490 B2
(45) Date of Patent: Apr. 18, 2017

(54) MITIGATING THE EFFECT OF A CHANGE IN SENSOR CALIBRATION PARAMETERS

(75) Inventor: Joseph Czompo, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 797 days.

(21) Appl. No.: 13/418,741

(22) Filed: Mar. 13, 2012

(65) Prior Publication Data

US 2013/0144550 A1 Jun. 6, 2013

Related U.S. Application Data

(60) Provisional application No. 61/565,727, filed on Dec. 1, 2011.

(51) Int. Cl.

| | |
|---|---|
| *G01P 21/00* | (2006.01) |
| *G01C 25/00* | (2006.01) |
| *G01D 18/00* | (2006.01) |
| *G01D 3/032* | (2006.01) |

(52) U.S. Cl.
CPC .............. *G01P 21/00* (2013.01); *G01C 25/00* (2013.01); *G01C 25/005* (2013.01); *G01D 18/00* (2013.01); *G01D 3/032* (2013.01)

(58) Field of Classification Search
USPC ........................................................ 702/104
See application file for complete search history.

(56) References Cited

U.S. PATENT DOCUMENTS

| | | | |
|---|---|---|---|
| 5,736,937 A * | 4/1998 | McGirr | G08C 17/02 |
| | | | 324/402 |
| 5,828,585 A | 10/1998 | Welk et al. | |
| 6,349,260 B1 | 2/2002 | De Jong | |
| 6,477,477 B1 | 11/2002 | Thron et al. | |
| 7,640,106 B1 | 12/2009 | Stokar et al. | |
| 2005/0049473 A1* | 3/2005 | Desai et al. | 600/347 |
| 2005/0253912 A1 | 11/2005 | Smith et al. | |
| 2006/0176048 A1 | 8/2006 | Zhou et al. | |
| 2010/0191085 A1 | 7/2010 | Budiman | |
| 2010/0194956 A1 | 8/2010 | Yuan et al. | |
| 2010/0288053 A1 | 11/2010 | Caulfield et al. | |

(Continued)

FOREIGN PATENT DOCUMENTS

| | | |
|---|---|---|
| CN | 1818702 A | 8/2006 |
| GB | 2281624 A * | 3/1995 |

(Continued)

OTHER PUBLICATIONS

International Search Report and Written Opinion—PCT/US2012/066812—ISA/EPO—Apr. 4, 2013.

*Primary Examiner* — Paul D Lee
(74) *Attorney, Agent, or Firm* — Muncy, Geissler, Olds & Lowe, P.C.

(57) ABSTRACT

The disclosure relates to mitigating the effect of a sudden change in sensor calibration parameters. An embodiment of the disclosure retrieves a current calibration parameter value for the sensor, determines a new calibration parameter value for the sensor, and generates transitional calibration parameter values based at least on the current calibration parameter value and the new calibration parameter value using an interpolation function configured to prevent a sudden change in the sensor calibration parameter values.

22 Claims, 6 Drawing Sheets

(56) References Cited

U.S. PATENT DOCUMENTS

2010/0304754 A1* 12/2010 Czompo et al. ........... 455/456.1
2010/0318292 A1* 12/2010 Kulik et al. .................. 701/210
2012/0022780 A1* 1/2012 Kulik et al. .................. 701/220

FOREIGN PATENT DOCUMENTS

JP         H0540477 A      2/1993
JP         2012104898 A      5/2012

* cited by examiner

MITIGATING THE EFFECT OF A CHANGE IN SENSOR CALIBRATION PARAMETERS

CLAIM OF PRIORITY UNDER 35 U.S.C. §119

The present application for patent claims priority to U.S. Provisional Application No. 61/565,727, entitled "MITIGATING THE EFFECT OF A CHANGE IN SENSOR CALIBRATION PARAMETERS", filed Dec. 1, 2011, and assigned to the assignee hereof and hereby expressly incorporated by reference herein.

FIELD OF DISCLOSURE

The disclosure relates generally to mitigating the effect of a change in sensor calibration parameters.

BACKGROUND

Cell phones are frequently equipped with sensors, such as a gyroscope and an accelerometer, that track the movement of the cell phone. The gyroscope tracks the rotation of the device as it tilts forward or backward, turns from portrait to landscape, and twists from side to side. The accelerometer measures the linear movement of the device as it moves up or down, left or right, and toward or away from the user. The data from the gyroscope and accelerometer can be digitized and synthesized to support a motion-based user interface on the cell phone, as well as other applications, such as motion-based video games.

For accuracy, sensors must be calibrated, and occasionally recalibrated. Sensor calibration and auto-calibration methods usually cause a sudden change, e.g., a relatively instantaneous jump in streaming sensor data. That is, after a new value for a calibration parameter is determined, the corrected sensor data that are subject to the new calibration value generally suffer from a sudden change when the new calibration value is introduced in the correction. This can lead to an undesirable experience for users of an application that uses the calibrated sensor data.

Some applications that use the calibrated data could actually malfunction if the data have sudden changes. For example, a 3D pointing application (e.g. in a video game or the user interface) that uses gyroscope or accelerometer data may suddenly change the direction of pointing if the gyroscope or accelerometer bias suddenly changes. Slow changes, however, may be tolerated since the user has the chance to react to the change.

One solution to avoid the sudden changes/data jumps due to recalibration is to avoid the calibrated data stream entirely by those applications (i.e. data clients) that cannot tolerate the jumps. Another solution is to apply the calibration only once, at the beginning of the data usage session.

SUMMARY

The disclosure relates to mitigating the effect of a sudden change in sensor calibration parameters. An embodiment of the disclosure retrieves a current calibration parameter value for the sensor, determines a new calibration parameter value for the sensor, and generates transitional calibration parameter values based on at least the current calibration parameter value and the new calibration parameter value using an interpolation logic configured to prevent a sudden change in the sensor calibration parameter values.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
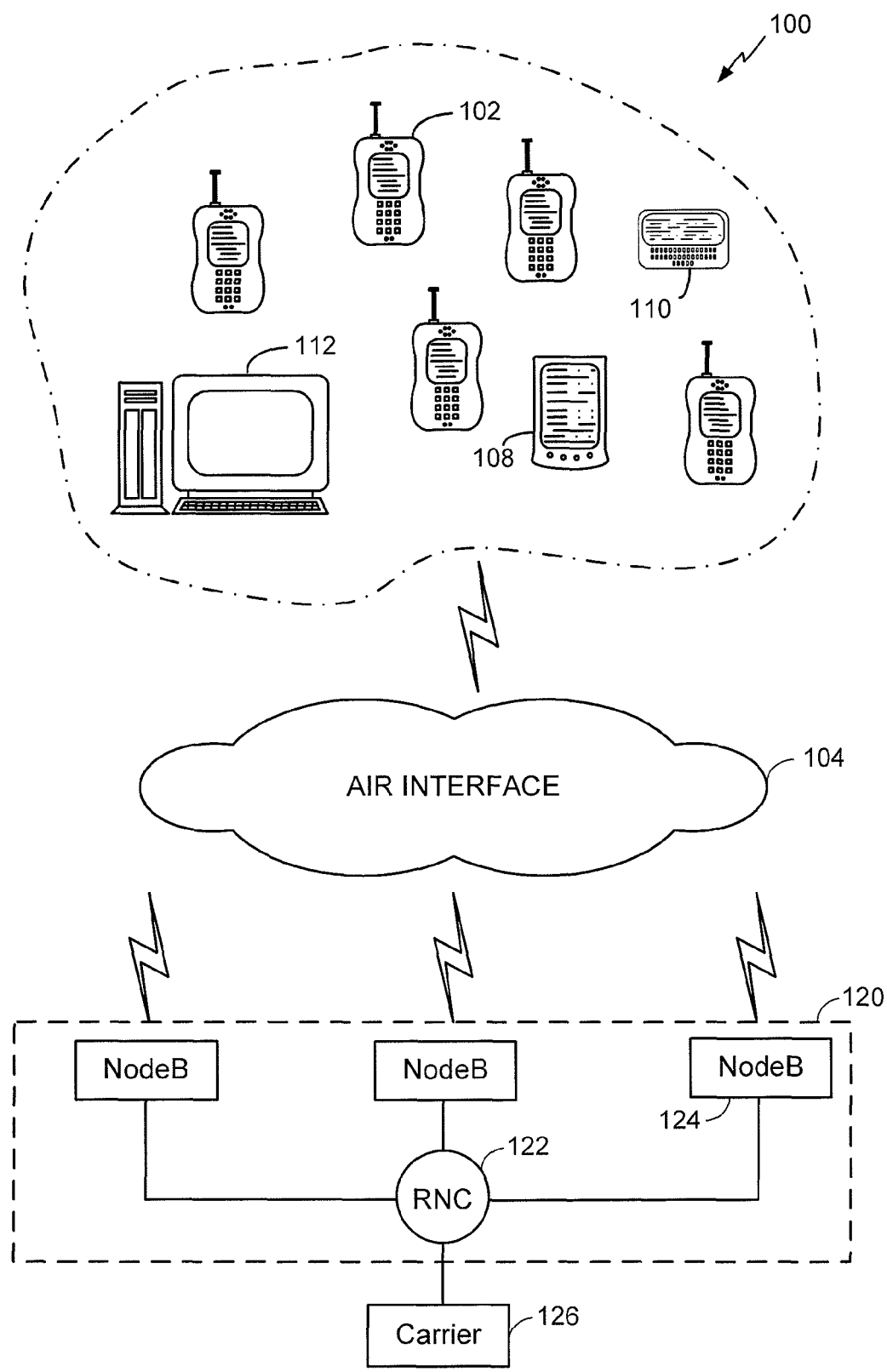
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
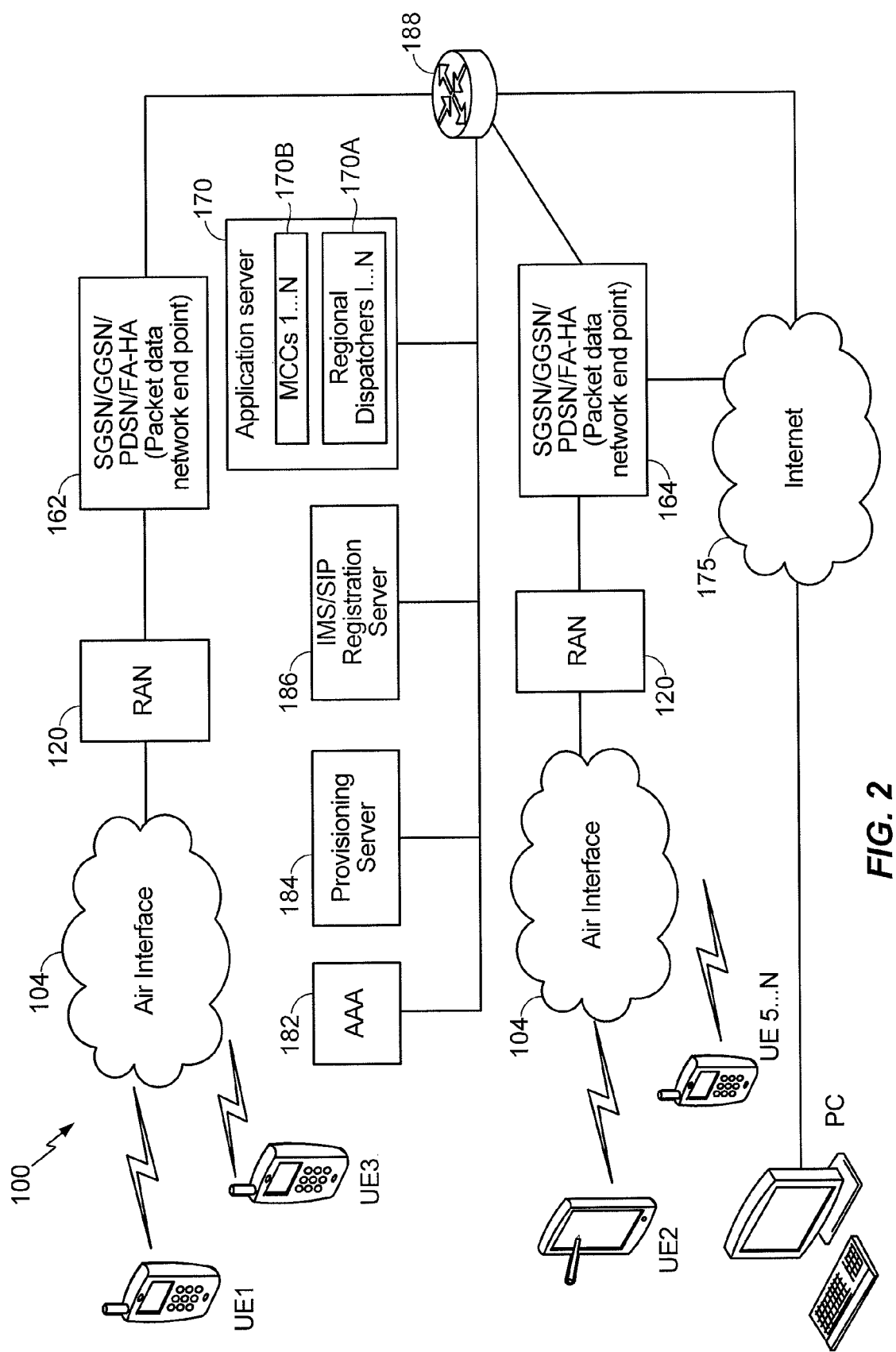
FIG. 2 illustrates an example of the wireless communications system of FIG. 1 in more detail.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. The application server 170 is illustrated as including one or more media control complexes (MCCs) 1 . . . N 170B, and one or more regional dispatchers 1 . . . N 170A. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2, UEs 1, 3 and 5 . . . N are illustrated as wireless cell-phones, UE 2 is illustrated as a wireless tablet-and/or laptop PC. However, in other embodiments, it will be appreciated that the wireless communication system 100 can connect to any type of UE, and the examples illustrated in FIG. 2 are not intended to limit the types of UEs that may be implemented within the system.

Figure 3:
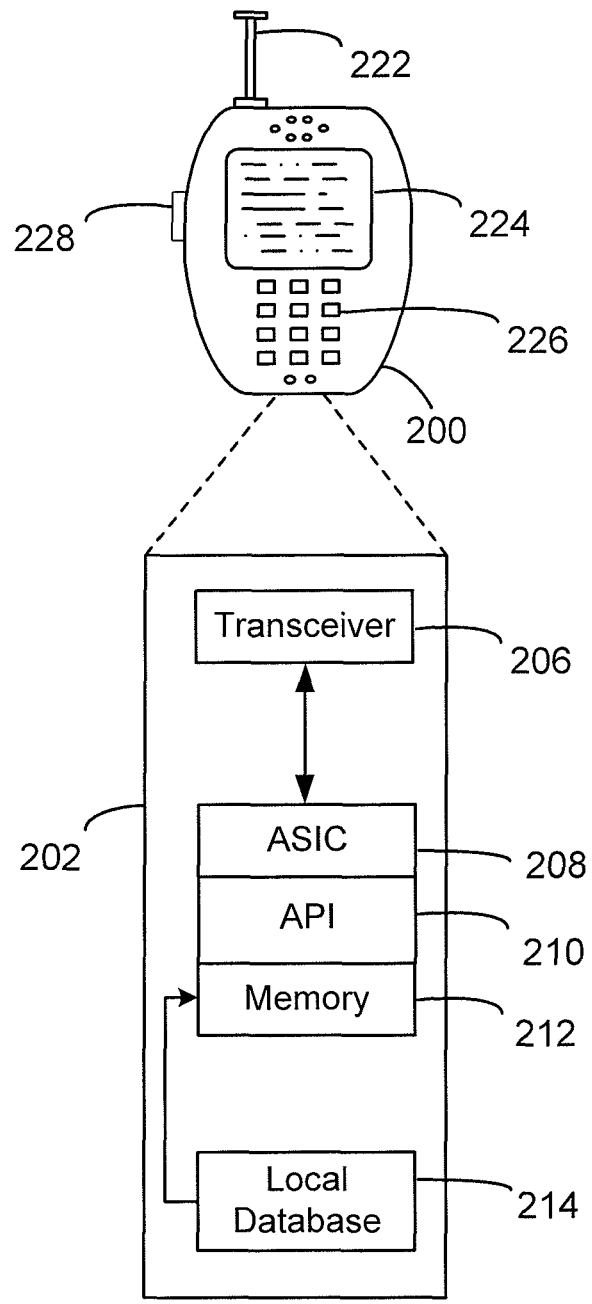
FIG. 3 illustrates a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 4:
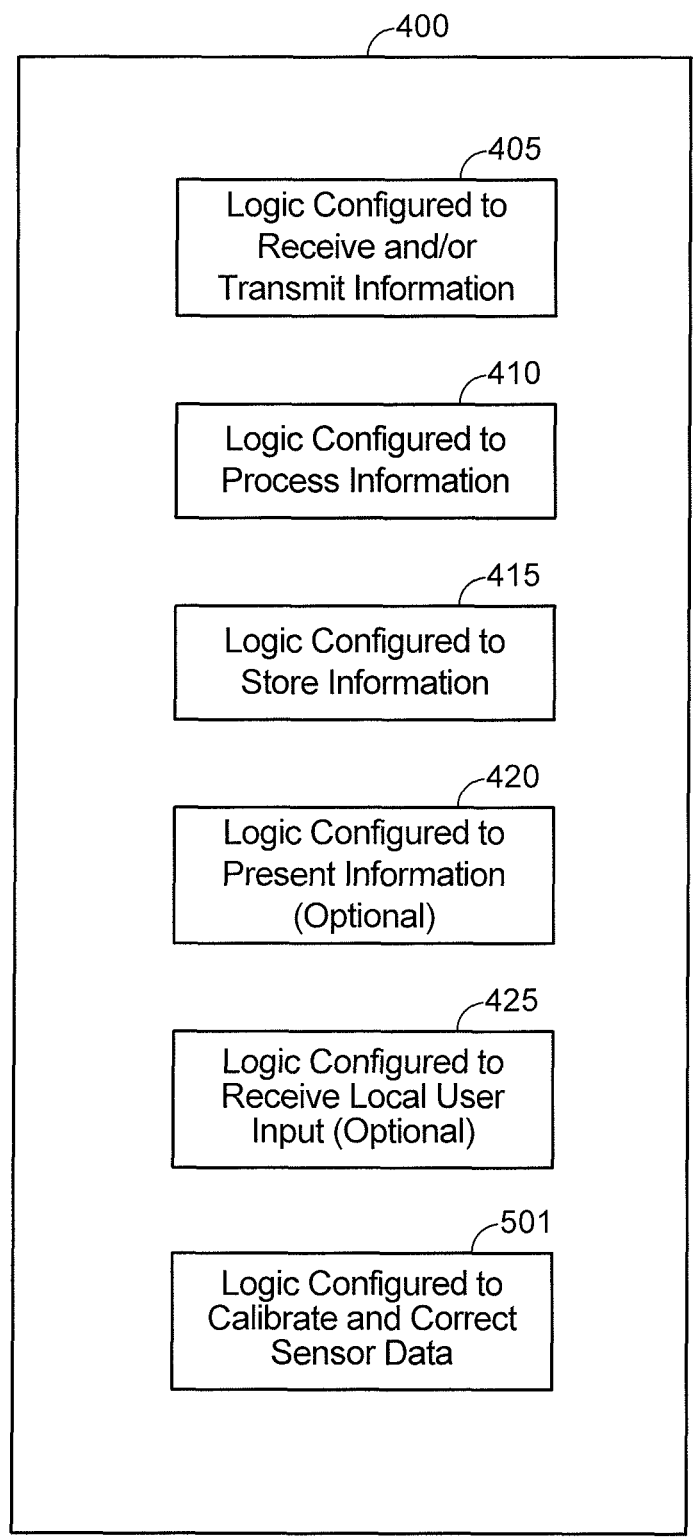
FIG. 4 illustrates a communication device that includes logic configured to perform functionality related to at least one embodiment of the invention.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN 160, GGSN 165, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 405. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410. Finally, embodiments include logic configured to calibrate and correct sensor data 501, as will be described in more detail below.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

An embodiment of the invention creates a smooth transition from a calibration parameter that is already in use to a newly determined parameter value, in order to avoid jumps in the calibrated data. A suitably selected time function morphs the previous value to the new value, providing a smooth transition over time. As an example, a linear change between the previous calibration parameter and the new calibration parameter can be used. The time constant of the transition, i.e. the time needed to reach the new value, is also suitably selected. The consideration for the selection is the tolerance against jumps in applications that are consumers of the data.

Figure 5:
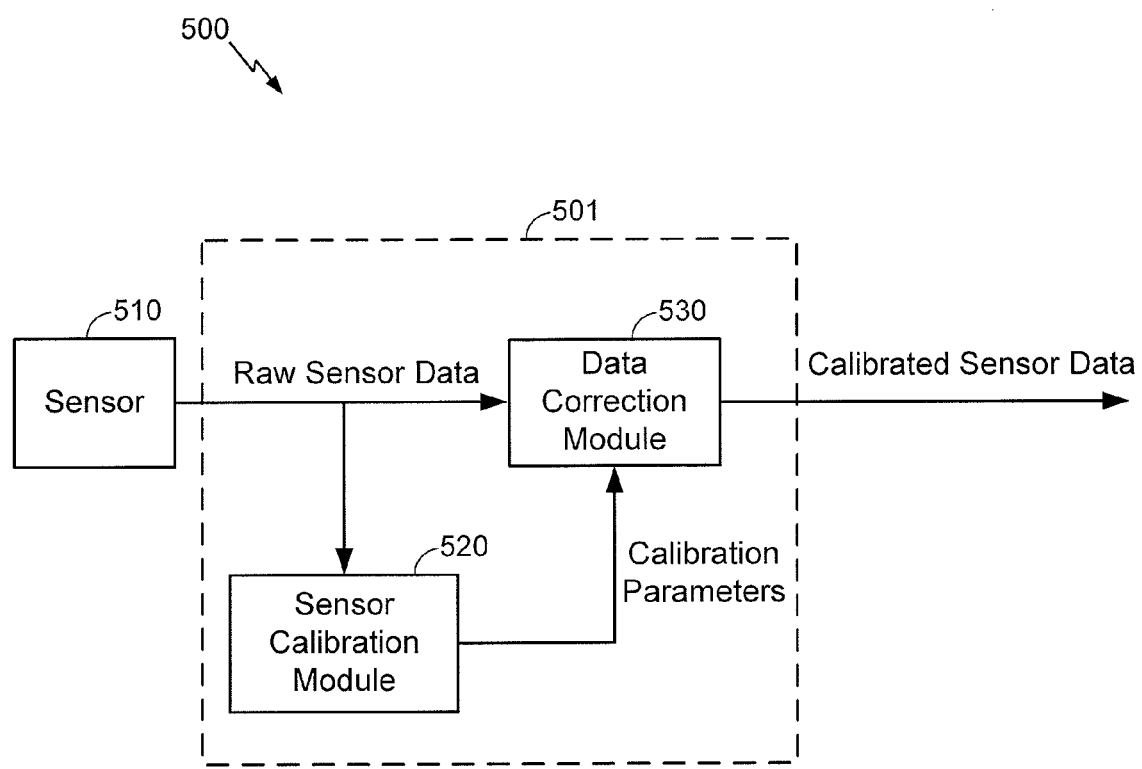
FIG. 5 illustrates an exemplary system for mitigating the effect of a change in sensor calibration parameters, according to at least one embodiment of the invention.

FIG. 5 illustrates a system 500 for mitigating the effect of a change in sensor calibration parameters, according to an embodiment of the invention. System 500 includes a sensor 510, and logic 501 including a sensor calibration module 520, and a data correction module 530. System 500 may be embodied in a single processing unit, such as a central processing unit, a microprocessor, an ASIC, etc., or multiple processing units. System 500 may be integrated into UE 200.

Sensor 510 may be any sensor that detects an input and generates an associated output, e.g., a gyroscope, an accelerometer, a microphone, a transducer (i.e. tactile sensor), a photo detector (i.e., light sensor), etc. Sensors are well-known in the art and will not be further described here for the sake of brevity. Sensor 510 outputs a stream of raw sensor data to sensor calibration module 520 and data correction module 530. Sensor calibration module 520 receives the raw sensor data from sensor 510 and generates calibration parameters to send to data correction module 530. Generating the calibration parameters will be discussed in more detail below. Data correction module 530 receives the raw sensor data from sensor 510 and the calibration parameters from sensor calibration module 520 and generates calibrated sensor data based on these inputs. Traditionally, when a new calibration parameter value is determined, it is applied immediately, and there is often a noticeable change (e.g., a discontinuity, step change, etc.) in the corrected sensor data that are subject to the new value. As will be discussed in more detail below, system 500 mitigates the effect of a change in sensor calibration parameter value by transitioning to the new value gradually over time using techniques such as those described in the following paragraphs.

Figure 6:
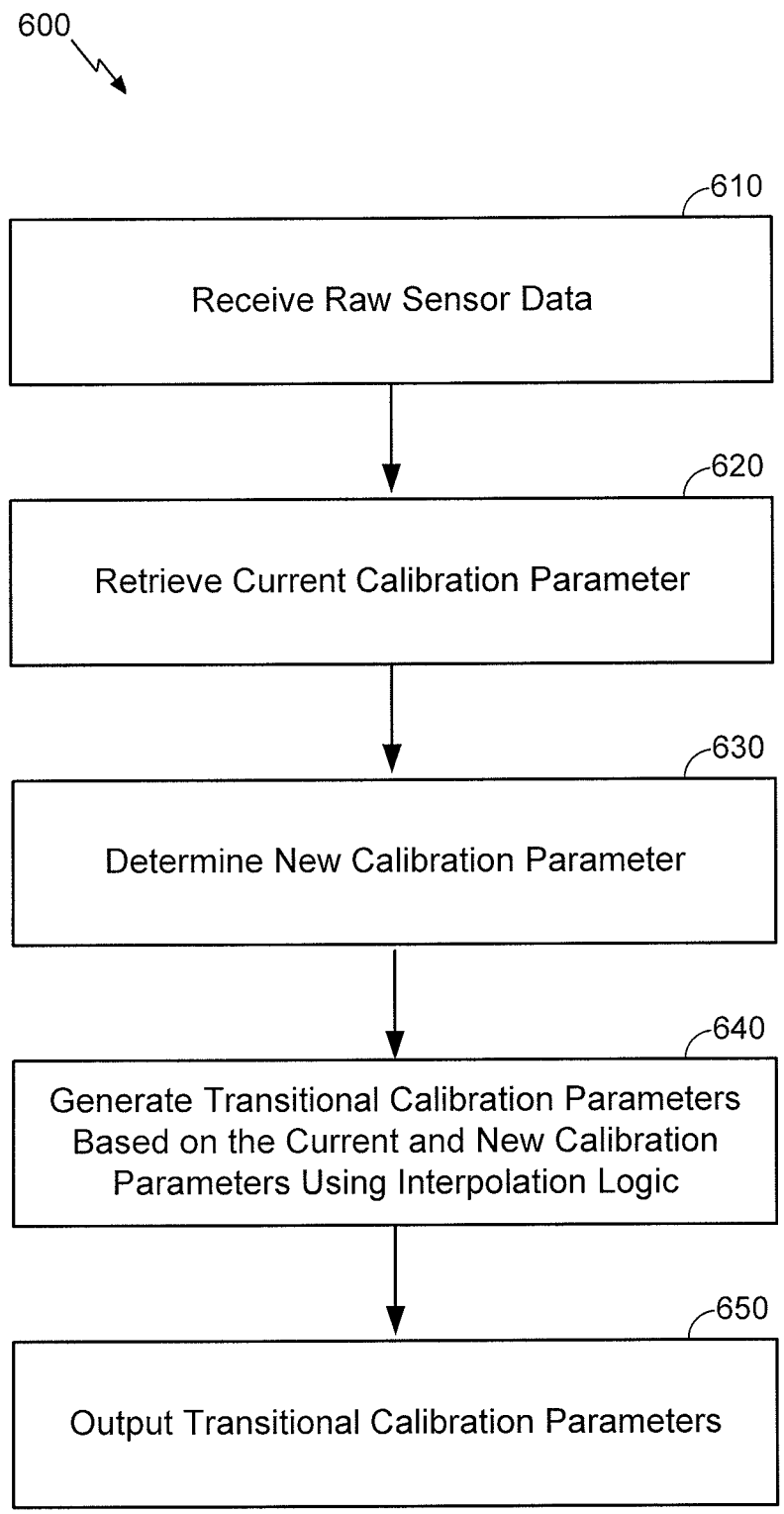
FIG. 6 illustrates an exemplary method for mitigating the effect of a change in sensor calibration parameters, according to at least one embodiment of the invention.

FIG. 6 illustrates a method for mitigating the effect of a change in sensor calibration parameters, according to an embodiment of the invention. While method 600 is described as being performed by sensor calibration module 520, it will be apparent to one of skill in the art that method 600 may be performed by system 500, logic 501, or sensor calibration module 520. At 610, sensor calibration module 520 receives raw sensor data from sensor 510. At 620, sensor calibration module 520 retrieves the current values of the calibration parameters. At 630, sensor calibration module 520 determines new values of the calibration parameters. At 640, sensor calibration module 520 generates transitional values for the calibration parameters from the values of the current calibration parameters and the new calibration parameters using interpolation logic, which may be integrated into calibration module 520. At 650, sensor calibration module 520 outputs the transitional values of the calibration parameters to data correction module 530 over a given transition time.

The interpolation logic generates intermediate, i.e. transitional, values of the calibration parameters that are between the current values of the calibration parameters and the newly determined values of the calibration parameters. The interpolation logic may additionally use one or more past sets of calibration parameters. That is, the interpolation logic may use one or more past sets of "current" and "new" calibration parameters along with the current set of "current" and "new" parameters in order to generate the transitional values. This is multi-point interpolation.

The interpolation logic may be a linear or non-linear function, and generates calibration parameter values based on a given transition time. For example, linear interpolation logic may generate transitional values at equal intervals between the current calibration parameter value and the new calibration parameter value. Sensor calibration module 520 could then output the transitional values to data correction module 530 at equal intervals over the given transition time. The given transition time may be based on the difference in value between the current and new values of the calibration parameters, or a fixed time period, or based on some other factor. For example, if the given transition time is based on the difference between the current and new values, and the difference between those values is large, the transition time would be longer than if the difference between the values was smaller.

At the end of the given transition time, the new values (not the intermediate values) of the calibration parameters may be established as the current values of the calibration parameters and output to data correction module 530. Alternatively, the new values of the calibration parameters may be established as the current values of the calibration parameters after completion of the interpolation logic. Either way, calibration module 520 will output the new values of the calibration parameters as the current values of the calibration parameters after the transition from the current values to the new values is complete.

The given transition time may be changed, i.e. increased or decreased, to improve the calibration correction performance. For example, if the transition time is too short, the user may notice a sudden change in sensor data. In such a case, the transition time could be increased. Further, the transitioning may be performed in real-time, as sensor calibration module 520 receives raw sensor data. Alternatively, the transitioning may be done in a post-processing mode if the new values of the calibration parameters are time-stamped.

Data correction at a particular time $t_k$ with calibration parameters index j for data point x is given by the formula:

$$x_{calibrated,t_k} = (x_{raw,t_k} - bias_j) \cdot ScaleFactor_j$$

Traditionally, when new calibration parameters (e.g. index j+1) are introduced at a later time $t_{k+1}$, the new correction is applied immediately:

$$x_{calibrated,t_{k+1}} = (x_{raw,t_{k+1}} - bias_{j+1}) \cdot ScaleFactor_{j+1}$$

This causes discontinuities (e.g., a step or jump) in the calibrated data. The following is an example of an embodiment of the invention using a linear interpolation function that may be implemented in the interpolation logic.

In contrast to the step change discussed above, an exemplary embodiment of the invention introduces the new values of the calibration parameters gradually over time, so that they are fully effective at a time $t_{k+1}+T$, where T is a configurable transition time. For example, when $0 < t \leq T$:

$$bias_{t_{k+1}+t} = \frac{bias_{j+1} - bias_j}{T} \cdot t + bias_j$$

When t>T:

$$bias_{t_{k+1}+t} = bias_{j+1}$$

The scale factor is similarly adjusted. The correction formula then becomes:

$$x_{calibrated,t_{k+1}+t} = (x_{raw,t_{k+1}+t} - bias_{t_{k+1}+t}) \cdot ScaleFactor_{t_{k+1}+t}$$

For each raw data value received after $t_{k+1}$, a new corresponding bias and scale factor is applied until they reach their newly determined value at $t_{k+1}+T$, at which point they are kept at their newly determined value. It will be readily apparent to one of skill in the art that the calibration parameters need not be only bias and scale factor, but rather may include bias, scale factor, axis non-orthogonality, axis misalignment, cross-sensor misalignment (e.g. in the case of multiple sensors), etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for mitigating the effect of a change in sensor calibration parameters. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for calibrating a sensor in a wireless device, comprising:
retrieving, at the wireless device, a current calibration parameter value for the sensor, wherein the current calibration parameter value is a scale factor value or an axis non-orthogonality value;
determining, at the wireless device, a new calibration parameter value for the sensor;
generating, at the wireless device, one or more transitional calibration parameter values for the sensor based on at least the current calibration parameter value and the new calibration parameter value using interpolation logic configured to prevent a sudden change in a stream of calibrated sensor data;
generating, at the wireless device, a stream of raw sensor data by using the sensor to measure a local environment of the wireless device; and
generating, at the wireless device, the stream of calibrated sensor data based on the stream of raw sensor data, the current calibration parameter value, the one or more transitional calibration parameter values, and the new calibration parameter value,
wherein the generating the stream of calibrated sensor data comprises:
generating a stream of transitional calibrated sensor data based on the stream of raw sensor data generated during a transition time and the one or more transitional calibration parameter values; and
generating a stream of new calibrated sensor data based on the stream of raw sensor data generated subsequent to the transition time and the new calibration parameter value.

2. The method of claim 1, wherein the interpolation logic includes a linear interpolation function.

3. The method of claim 1, wherein the interpolation logic includes a non-linear interpolation function.

4. The method of claim 1, further comprising:
establishing the new calibration parameter value as the current calibration parameter value after a predetermined time.

5. The method of claim 1, further comprising:
establishing the new calibration parameter value as the current calibration parameter value after completion of the interpolation logic.

6. The method of claim 1, further comprising:
transitioning from the current calibration parameter value to the new calibration parameter value by outputting the one or more transitional calibration parameter values.

7. The method of claim 6, wherein the transitioning comprises transitioning from the current calibration parameter value to the new calibration parameter value in real-time.

8. The method of claim 6, further comprising:
changing an amount of time of the transition time,
wherein the transitioning comprises transitioning from the current calibration parameter value to the new calibration parameter value over the changed transition time, to improve performance of the sensor calibration.

9. The method of claim 1, further comprising:
timestamping the new calibration parameter value,
wherein the transitioning comprises transitioning from the current calibration parameter value to the new calibration parameter value in a post-processing mode.

10. The method of claim 1, further comprising:
retrieving a previous set of current and new calibration parameter values for the sensor,
wherein the generating the one or more transitional calibration parameter values comprises generating the one or more transitional calibration parameter values based on the previous set of current and new calibration parameter values, the current calibration parameter value, and the new calibration parameter value using multi-point interpolation logic configured to prevent the sudden change in the stream of calibrated sensor data.

11. An apparatus for calibrating a sensor in a wireless device, comprising:
  means for retrieving a current calibration parameter value for the sensor, wherein the current calibration parameter value is a scale factor value or an axis non-orthogonality value;
  means for determining a new calibration parameter value for the sensor;
  means for generating one or more transitional calibration parameter values for the sensor based on at least the current calibration parameter value and the new calibration parameter value using interpolation logic configured to prevent a sudden change in a stream of calibrated sensor data;
  means for generating a stream of raw sensor data by using the sensor to measure a local environment of the wireless device; and
  means for generating the stream of calibrated sensor data based on the stream of raw sensor data, the current calibration parameter value, the one or more transitional calibration parameter values, and the new calibration parameter value,
  wherein the means for generating the stream of calibrated sensor data
    generates a stream of transitional calibrated sensor data based on the stream of raw sensor data generated during a transition time and the one or more transitional calibration parameter values, and
    generates a stream of new calibrated sensor data based on the stream of raw sensor data generated subsequent to the transition time and the new calibration parameter value, and
  wherein the apparatus is hardware or a combination of hardware and software.

12. A wireless device, comprising:
  logic configured to retrieve a current calibration parameter value for a sensor in the wireless device, wherein the current calibration parameter value is one of a scale factor value or an axis non-orthogonality value;
  logic configured to determine a new calibration parameter value for the sensor;
  logic configured to generate one or more transitional calibration parameter values for the sensor based on at least the current calibration parameter value and the new calibration parameter value using interpolation logic configured to prevent a sudden change in a stream of calibrated sensor data;
  logic configured to generate a stream of raw sensor data by using the sensor to measure a local environment of the wireless device; and
  logic configured to generate the stream of calibrated sensor data based on the stream of raw sensor data, the current calibration parameter value, the one or more transitional calibration parameter values, and the new calibration parameter value,
  wherein the logic configured to generate the stream of calibrated sensor data
    is configured to generate a stream of transitional calibrated sensor data based on the stream of raw sensor data generated during a transition time and the one or more transitional calibration parameter values, and
    is configured to generate a stream of new calibrated sensor data based on the stream of raw sensor data generated subsequent to the transition time and the new calibration parameter value.

13. The wireless device of claim 12, wherein the interpolation logic includes a linear interpolation function.

14. The wireless device of claim 12, wherein the interpolation logic includes a non-linear interpolation function.

15. The wireless device of claim 12, further comprising:
  logic configured to establish the new calibration parameter value as the current calibration parameter value after a predetermined time.

16. The wireless device of claim 12, further comprising:
  logic configured to establish the new calibration parameter value as the current calibration parameter value after completion of the interpolation logic.

17. The wireless device of claim 12, further comprising:
  logic configured to transition from the current calibration parameter value to the new calibration parameter value by outputting the one or more transitional calibration parameter values.

18. The wireless device of claim 17, wherein the logic configured to transition is configured to transition from the current calibration parameter value to the new calibration parameter value in real-time.

19. The wireless device of claim 17, further comprising:
  logic configured to change an amount of time of the transition time,
  wherein the logic configured to transition is configured to transition from the current calibration parameter value to the new calibration parameter value over the changed transition time, to improve performance of the sensor calibration.

20. The wireless device of claim 12, further comprising:
  logic configured to timestamp the new calibration parameter value,
  wherein the logic configured to transition is configured to transition from the current calibration parameter value to the new calibration parameter value in a post-processing mode.

21. The wireless device of claim 12, further comprising:
  logic configured to retrieve a previous set of current and new calibration parameter values for the sensor,
  wherein the logic configured to generate the one or more transitional calibration parameter values is configured to generate the one or more transitional calibration parameter values based on the previous set of current and new calibration parameter values, the current calibration parameter value, and the new calibration parameter value using multi-point interpolation logic configured to prevent the sudden change in the stream of calibrated sensor data.

22. A non-transitory computer-readable medium for calibrating a sensor in a wireless device, comprising:
  at least one instruction for retrieving a current calibration parameter value for the sensor, wherein the current calibration parameter value is one of a scale factor value or an axis non-orthogonality value;
  at least one instruction for determining a new calibration parameter value for the sensor;
  at least one instruction for generating one or more transitional calibration parameter values for the sensor based on at least the current calibration parameter value and the new calibration parameter value using interpolation logic configured to prevent a sudden change in a stream of calibrated sensor data;

at least one instruction for generating a stream of raw sensor data by using the sensor to measure a local environment of the wireless device; and at least one instruction for generating the stream of calibrated sensor data based on the stream of raw sensor data, the current calibration parameter values, the one or more transitional calibration parameter values, and the new calibration parameter value, wherein the at least one instruction for generating the stream of calibrated sensor data comprises:

at least one instruction for generating a stream of transitional calibrated sensor data based on the stream of raw sensor data generated during a transition time and the one or more transitional calibration parameter values; and at least one instruction for generating a stream of new calibrated sensor data based on the stream of raw sensor data generated subsequent to the transition time and the new calibration parameter value.

\* \* \* \* \*